US010848670B2

(12) United States Patent
Gatti et al.

(10) Patent No.: US 10,848,670 B2
(45) Date of Patent: Nov. 24, 2020

(54) CAMERA SYSTEMS ADAPTED FOR INSTALLATION IN A VEHICLE

(71) Applicant: Amazon Technologies, Inc., Seattle, WA (US)

(72) Inventors: Brian Gatti, Phoenix, AZ (US); Danylo Dorofeyev, Kiev (UA); Aaron Harpole, Santa Monica, CA (US); Eugene Lee, Santa Monica, CA (US); Jonathan Thomas Little, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/012,675

(22) Filed: Jun. 19, 2018

(65) Prior Publication Data

US 2018/0367731 A1 Dec. 20, 2018

Related U.S. Application Data

(60) Provisional application No. 62/521,865, filed on Jun. 19, 2017, provisional application No. 62/634,714, filed on Feb. 23, 2018.

(51) Int. Cl.
| | | |
|---|---|---|
| *B60R 25/20* | (2013.01) | |
| *H04N 5/232* | (2006.01) | |
| *G06K 9/00* | (2006.01) | |
| *H04N 19/463* | (2014.01) | |
| *G08B 13/196* | (2006.01) | |

(Continued)

(52) U.S. Cl.
CPC ....... *H04N 5/23238* (2013.01); *B60R 25/102* (2013.01); *B60R 25/2063* (2013.01); *B60R 25/302* (2013.01); *B60R 25/305* (2013.01); *B60R 25/32* (2013.01); *B60R 25/33* (2013.01); *B60R 25/34* (2013.01); *B60R 25/403* (2013.01); *G06K 9/00791* (2013.01); *G06K 9/00832* (2013.01); *G08B 13/19647* (2013.01); *G08B 13/19697* (2013.01); *H04N 5/232* (2013.01); *H04N 5/23206* (2013.01); *H04N 5/23241* (2013.01); *H04N 5/23245* (2013.01); *H04N 7/18* (2013.01); *H04N 7/181* (2013.01); *H04N 19/463* (2014.11); *H04N 21/2187* (2013.01); *H04N 21/2743* (2013.01); *H04N 21/41422* (2013.01); *H04N 21/4223* (2013.01); *H04N 21/44008* (2013.01); *H04N 21/4621* (2013.01);

(Continued)

(58) Field of Classification Search
CPC .................. H04N 5/23238; H04N 19/463
See application file for complete search history.

(56) References Cited

U.S. PATENT DOCUMENTS

| 7,193,644 B2 | 3/2007 | Carter |
|---|---|---|
| 8,139,098 B2 | 3/2012 | Carter |

(Continued)

*Primary Examiner* — Girumsew Wendmagegn
(74) *Attorney, Agent, or Firm* — Lathrop GPM LLP

(57) ABSTRACT

A camera system for vehicles captures panoramic video, has a unique identifier, and has an image processor that compresses the video and detects events. It transmits compressed video with one or more of a timestamp, a unique identifier, a location, and event flags through a network (e.g., cellular) to a server. A GPS device (or the like) may be adapted to determine location. Particular embodiments process the video to detect events, and, upon detecting these events, transmit video at a high data rate while using a low data rate at other times.

19 Claims, 5 Drawing Sheets

(51) Int. Cl.
  *B60R 25/40*      (2013.01)
  *B60R 25/30*      (2013.01)
  *B60R 25/33*      (2013.01)
  *B60R 25/32*      (2013.01)
  *B60R 25/34*      (2013.01)
  *B60R 25/102*     (2013.01)
  *H04N 21/2743*    (2011.01)
  *H04N 21/414*     (2011.01)
  *H04N 21/4223*    (2011.01)
  *H04N 7/18*       (2006.01)
  *H04N 21/462*     (2011.01)
  *H04N 21/2187*    (2011.01)
  *H04N 21/44*      (2011.01)

(52) U.S. Cl.
  CPC .... *B60R 2325/105* (2013.01); *G06K 9/00288* (2013.01)

(56) References Cited

U.S. PATENT DOCUMENTS

| | | |
|---|---|---|
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2008/0012693 A1* | 1/2008 | Shimomura .......... B60R 25/102 340/426.1 |
| 2012/0105635 A1* | 5/2012 | Erhardt ................ B60R 25/102 348/148 |
| 2015/0169968 A1* | 6/2015 | Michmerhuizen .......................... G08B 13/19695 348/148 |
| 2016/0152211 A1* | 6/2016 | Owens ................ B60R 25/102 348/36 |
| 2016/0280131 A1* | 9/2016 | Carson, Jr. .............. B60Q 9/00 |
| 2017/0372573 A1* | 12/2017 | Park ...................... H04N 7/185 |

\* cited by examiner

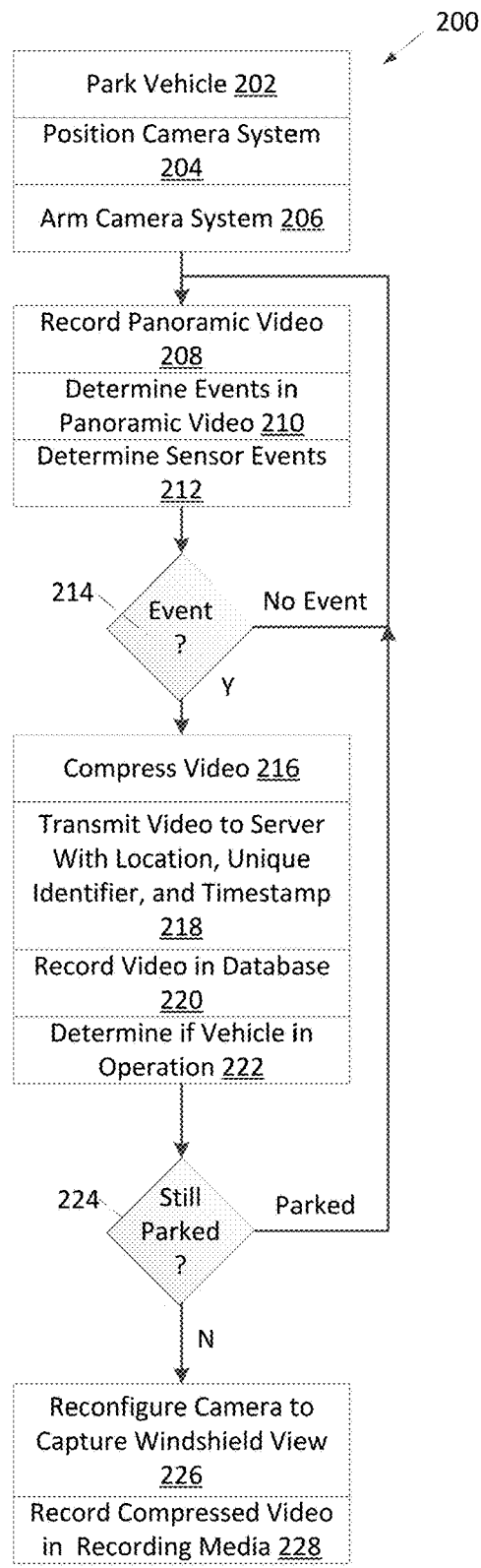
FIG. 2
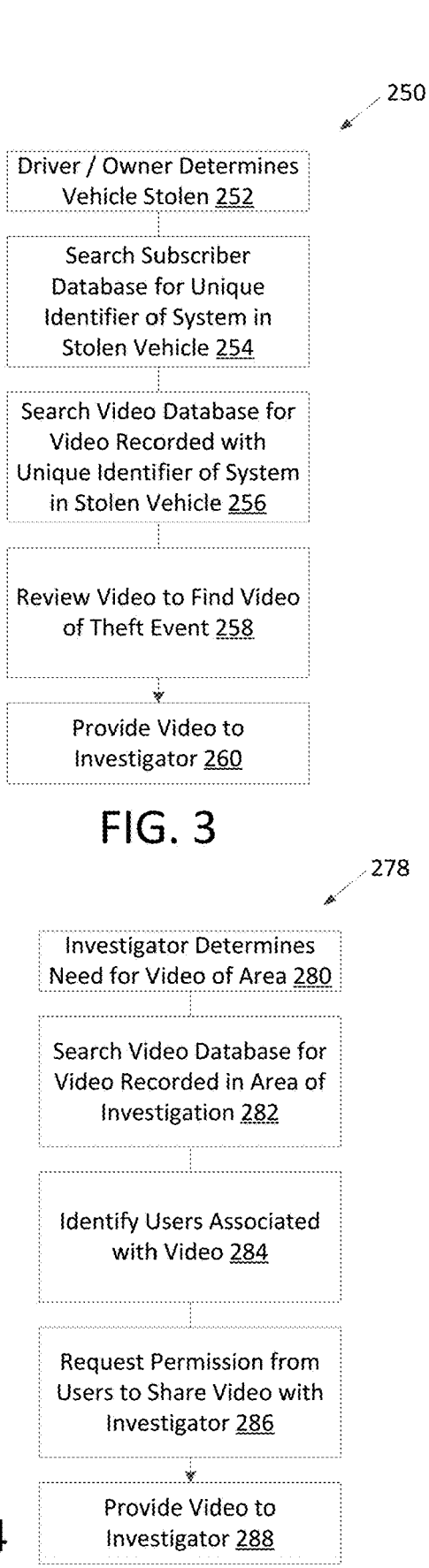
FIG. 3
FIG. 4

CAMERA SYSTEMS ADAPTED FOR INSTALLATION IN A VEHICLE

RELATED APPLICATIONS

This application claims priority to U.S. Provisional Application Ser. No. 62/521,865 filed Jun. 19, 2017, and U.S. Provisional Application Ser. No. 62/634,714 filed Feb. 23, 2018, both of which are incorporated herein by reference in their entirety.

SUMMARY

The various embodiments of the present camera systems adapted for installation in a vehicle have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that many vehicles are stolen or broken into each year. Motor vehicles typically cost tens of thousands of dollars. In 2012, about 700,000 vehicles were stolen in the United States alone, costing owners over four billion dollars. In addition to vehicle theft, theft of electronics such as high-end audio and global positioning navigation systems from vehicles is prevalent. Thieves may also steal packages and other objects left within unattended vehicles. The present embodiments solve this problem by leveraging the functionality of A/V recording and communication devices to provide vehicle-mountable camera devices. In particular, embodiments of the present camera system adapted for installation in a vehicle provide surveillance both within the vehicle and of a surrounding area through vehicle windows. The system is configured to capture video when the vehicle is stationary (as well as, in some embodiments, when the vehicle is moving), such as in response to detected motion near the vehicle. The system is advantageously able to capture video of thieves and vandals, which may help to expedite apprehension and prosecution of criminal perpetrators. The system is further advantageously able to deter theft by its mere presence in the vehicle. When positioned prominently within the vehicle, such as on the dashboard, would-be thieves and vandals are likely to be dissuaded from committing crimes in the area where their misdeeds may be captured on video by the present camera system.

In a first aspect of an embodiment designated A, a camera system adapted for installation in a vehicle has an electronic camera for capturing panoramic video and a unique identifier recorded in nonvolatile memory. The system has a digital image processing subsystem that receives the panoramic video and compresses it into compressed video. The image processing subsystem is configured to transmit the compressed video with timestamp and unique identifier over a digital radio subsystem to a network-accessible server. The system has a power system with a battery and a charger and coupled to provide power to the electronic camera, the digital image processing subsystem, and the digital radio subsystem. The system may be positionable in a vehicle to perform surveillance both within the vehicle and of a surrounding area through vehicle windows. The system is advantageously able to both capture video of thieves to expedite prosecution and, in embodiments, deter theft. Since the system may transmit these videos directly after capture to a remote network, images may reach the server even if a thief promptly disables the system.

Particular embodiments designated AA of the first aspect of the camera system designated A include a satellite navigation receiver adapted to determine a location of the camera system; the camera system tags the compressed video with the location of the camera system. The tagged location may provide a location of the crimes captured on video to rapidly determine an appropriate law enforcement jurisdiction and gives additional information useful in apprehension and prosecution of criminals.

Particular embodiments designated AB of the first aspect designated A or embodiment designated AA capture 360-degree panoramic video to provide a view of events through all vehicle windows and within the vehicle interior.

Particular embodiments designated AC of the first aspect or embodiments designated AA or AB also are configured to process the video to detect significant events, and, upon detecting these events, transmit video over the digital radio at a high data rate throughout a timeout period upon occurrence of a significant event, and tag the compressed video with a significant-event flag. This aspect reduces bandwidth consumed during quiet periods, while allowing high resolution video near events such as theft.

Particular embodiments designated AD of the first aspect or embodiments designated AA, AB, or AC of the camera system include an accelerometer configured to detect motion of the camera system, and transmit compressed video at a high data rate with a motion sensed flag throughout a second timeout period upon detecting motion of the camera system. This aspect has the advantages of capturing high resolution images of thieves, and uploading of said high resolution images before the thieves can disable the system.

Particular embodiments designated AE of the first aspect or embodiments designated AA, AB, AC or AD are configured to identify faces seen in the panoramic video, and to transmit images of the faces to the server at high data rate with a significant-event flag. This aspect has the advantage of identifying faces in video of the significant event(s) to increase the potential usability of said captured video.

Particular embodiments, designated AF, of the first aspect or embodiments designated AA, AB, AC, AD or AE have a recording media, and the camera system is configured to record the panoramic video on the recording media as well as send compressed video to the server.

Particular embodiments, designated AG, of the embodiments designated AF, of the first aspect A, include a vehicle operation detector, and reconfigure the panoramic video from a 360-degree panoramic view to a windshield view upon vehicle operation. This embodiment serves the dual role of dashcam while driving and surveillance camera while parked or otherwise stopped.

In a particular embodiment, designated AGA, of the embodiment designated AG, the engine-on identification circuit is responsive to electrical noise, such as ignition or alternator noise, on a 12 VDC circuit of the vehicle.

Particular embodiments, designated AH, of the embodiments designated AG are configurable to suppress transmission of the compressed video to the server during vehicle operation to conserve bandwidth.

Embodiments of the first aspect of the camera system A, or the particular embodiments designated AA, AB, AC, AD, AE, AF, AG, or AH, include a mount for coupling with a vehicle mirror; thereby giving the system a view through the windshield, the rear window, and both side windows.

In a second aspect, designated B, a network-accessible server is configured to receive a compressed video, such as that transmitted by the camera system of the first aspect, having a unique identifier through a cellular telephone network and save the compressed video in a database. The network-accessible server retrieves the compressed video upon entry of a username associated with the unique identifier. In particular embodiments, the compressed video is tagged with a location and a timestamp, and, upon entry of a desired location and a range of times, the network accessible server retrieves compressed video tagged with locations near the desired location and recorded within the range of times. This second aspect may operate in conjunction with the first aspect to provide a surveillance system with video retrievable according to user and time; this aspect permits retrieval of video captured at or near times of thefts.

In a particular embodiment of the second aspect B, designated BA, the compressed video is tagged with a location and a timestamp, and, upon entry of a desired location and a range of times, the network accessible server is further configured to retrieve compressed video tagged with locations near the desired location and recorded within the range of times. This aspect has advantage in that video from cameras in other vehicles near a stolen vehicle, or from cameras in vehicles that happen to be parked near the scene of any other type of crime (e.g., burglary, robbery, murder, etc.), can be retrieved to aid investigators even when the vehicle in which the camera system is located is not stolen.

In a particular embodiment, designated BB, of the embodiment designated BA, upon entry of a desired location, the network accessible server is configured to retrieve usernames associated with the unique identifier of video tagged with locations near the desired location and to request a release authorization from a user before releasing the video tagged with locations near the desired location to any third party. This embodiment has advantage in preserving fourth-amendment rights of vehicle owners.

In a third aspect designated C, a method of conducting surveillance of motor vehicles includes recording panoramic video with an electronic camera system in the vehicle, the electronic camera system having a unique identifier and a digital image processing system; the panoramic video is compressed into compressed video. The method includes determining a location of the camera system using a satellite navigation system of the camera system and tagging the compressed video with the location of the camera system. Next, the compressed video and unique identifier are transmitted over the cellular telephone network to a network-accessible server. In particular embodiments, the panoramic video is processed to identify significant events, and transmitting the compressed video to the network-accessible server is performed at a high data rate throughout a timeout period upon occurrence of a significant event, and at a low data rate at other times.

In a particular embodiment, designated CA, of the third aspect C, the method includes identifying significant events in the panoramic video, and transmitting the compressed video to the network-accessible server is performed at a high data rate throughout a timeout period upon occurrence of a significant event, and at a lower data rate at other times.

In a particular embodiment, designated CB, of the third aspect C or of the embodiment designated CA, the method also includes detecting motion of the camera system. In this embodiment, transmitting the compressed video is performed at a high data rate throughout a second timeout period upon detecting motion of the camera system and the compressed video is tagged with a motion-sensed flag during the second timeout period.

In a particular embodiment, designated CC, of the third aspect C or any of the embodiments designated CA or CB, the method further includes detecting vehicle operation, and upon vehicle operation reconfiguring the camera system to record video from a windshield view.

In a fourth aspect, designated D, a camera system adapted for installation in a vehicle includes a motion detector configured to detect motion with respect to the vehicle, an accelerometer configured to detect vibrations associated with the vehicle, a camera configured to capture video of a field of view with respect to the vehicle, and, a processing subsystem configured to control the camera to capture video based on a triggering event including one or both of detection of motion by the motion detector and detection of acceleration by the accelerometer.

A particular embodiment, designated DA, of the fourth aspect D further includes a battery for powering the camera.

In a particular embodiment, designated DB, of the fourth aspect D or of the embodiment designated DA, the camera is configured in a low-resolution recording mode when the battery is powering the camera system, and in a high-resolution mode when a charger is powering the camera system.

In a particular embodiment, designated DC, of the fourth aspect D or any of the embodiments designated DA or DB, the camera is configured in a low-resolution mode prior to the triggering event, and in a high-resolution mode after the triggering event.

In a particular embodiment, designated DD, of the fourth aspect D or any of the embodiments designated DA, DB or DC, the accelerometer includes a plurality of accelerometers positioned at respective locations of the vehicle, where the processing subsystem is configured to control the camera to capture a field of view associated with the location of one or more of the accelerometers detecting the triggering event.

In a particular embodiment, designated DE, of the fourth aspect D or any of the embodiments designated DA, DB, DC or DD, the camera includes a plurality of cameras, where the processing subsystem is configured to activate one of the plurality of cameras associated with the location of one or more of the accelerometers detecting the triggering event.

In a particular embodiment, designated DF, of the fourth aspect D or any of the embodiments designated DA, DB, DC, DD or DE, the accelerometer is located on one or more of a bumper of the vehicle, a metal frame of the vehicle, a door of the vehicle, a roof of the vehicle, a hood of the vehicle, or a window of the vehicle.

A particular embodiment, designated DG, of the fourth aspect D or any of the embodiments designated DA, DB, DC, DD, DE or DF, further includes an audio sensor.

In a particular embodiment, designated DH, of the fourth aspect D or of the embodiment designated DG, the audio sensor is a glass break sensor.

A particular embodiment, designated DI, of the fourth aspect D or any of the embodiments designated DG or DH, further includes a digital radio subsystem and a speaker, where the processing subsystem is configured to establish, using the audio sensor, the digital radio subsystem, and the speaker, a two-way communication channel upon detection of the triggering event.

In a particular embodiment, designated DJ, of the fourth aspect D or any of the embodiments designated DG, DH or DI, the processing subsystem is further configured to transmit, using the digital radio subsystem, a stream of the captured video to an external device while the two-way communication channel is established.

A particular embodiment, designated DG, of the fourth aspect D or any of the embodiments designated DA, DB, DC, DD, DE, DF, DG, DH, DI or DJ, further includes an RFID (Radio Frequency Identification) sensor, where the processing subsystem is configured to deactivate and activate the motion sensor and the accelerometer based on receipt of a code transmitted from an RFID transmitter.

BRIEF DESCRIPTION OF THE FIGURES

The various embodiments of the present camera systems adapted for installation in a vehicle now will be discussed in detail with an emphasis on highlighting the advantageous features. These embodiments depict the novel and non-obvious camera systems adapted for installation in a vehicle shown in the accompanying drawings, which are for illustrative purposes only. These drawings include the following figures, in which like numerals indicate like parts:

FIG. 2 is a flowchart of an embodiment of a method of performing surveillance of a parked vehicle using the camera system of FIG. 1;

FIGS. 3 and 4 are flowcharts of embodiments of methods of locating video of interest to an investigation;

DETAILED DESCRIPTION OF THE EMBODIMENTS

Figure 1:
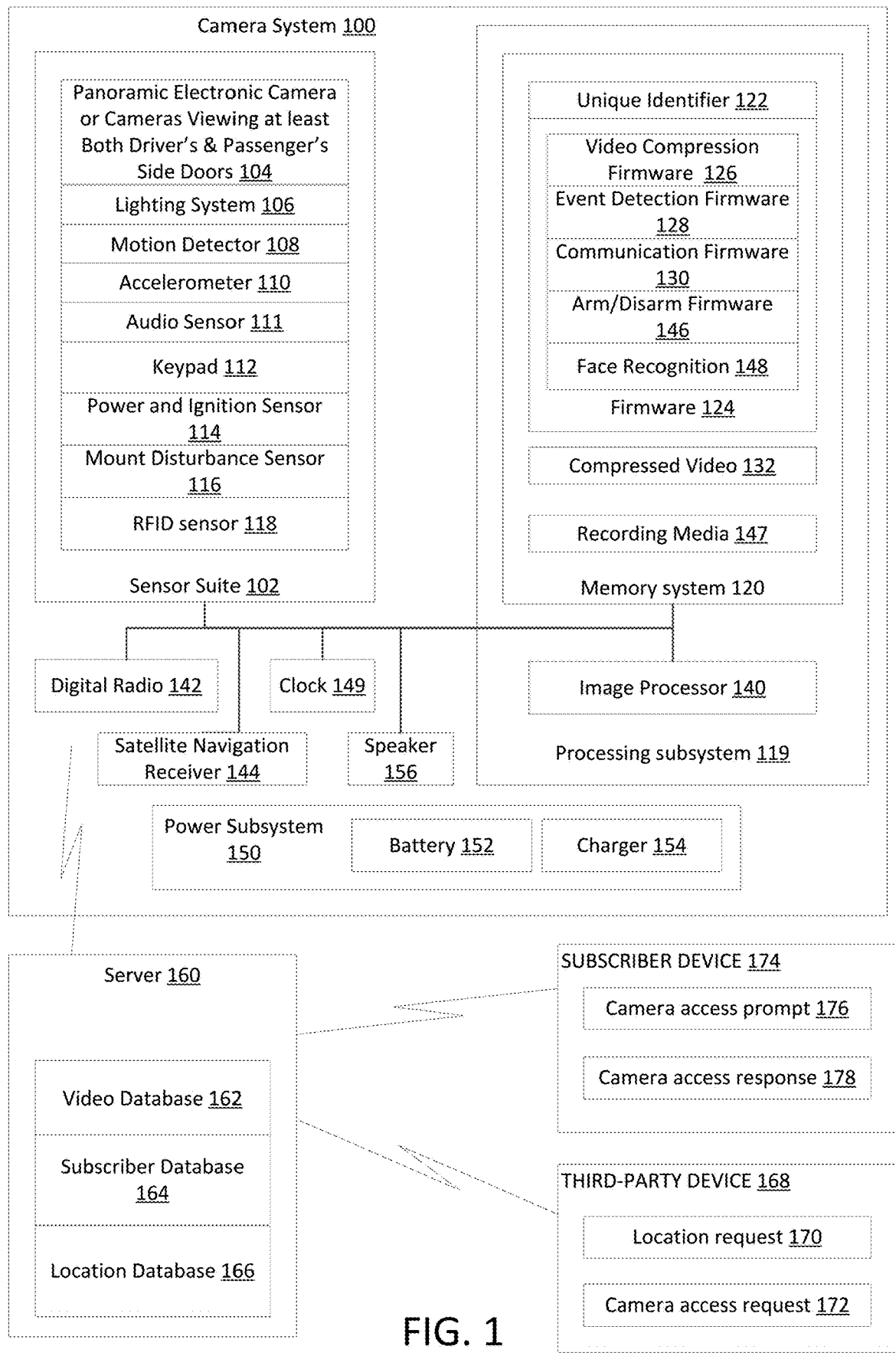
FIG. 1 is a block diagram of an embodiment of a camera system for installation in a vehicle.

FIG. 1 is a block diagram of a camera system 100 for installation in a vehicle. The camera system 100 includes a sensor suite 102 and is adapted to be mounted in a vehicle. The sensor suite 102 includes at least one electronic camera 104 configured to capture panoramic video. In one embodiment, the camera system 100 is adapted to be hung from a rear-view mirror upon parking the vehicle. In another embodiment, the camera system 100 has a suction cup mount and is configured for mounting on a windshield of the vehicle. In yet another embodiment, the camera system 100 is configured to be placed on a dashboard of the vehicle when parked. In yet another embodiment, the camera system 100 is configured for mounting on a removable side-window mount. In yet another embodiment, the camera system 100 is configured for permanent mounting in a dome-light fixture of the vehicle.

In yet another embodiment, the camera system 100 is built into the vehicle. In one built-in embodiment, the camera system 100 includes cameras mounted in the dashboard and adapted to record a panoramic view of a driver, a front-seat passenger, and both passenger-side and driver-side doors and side windows. In another built-in embodiment, the camera system 100 includes cameras mounted in the dome-light of the vehicle and adapted to record a view of both passenger-side and driver-side doors and side windows. In another built-in embodiment, the camera system 100 includes a camera mounted in a central brake light housing mounted to the headliner just ahead of the rear window, and has cameras adapted to record a view of the vehicle's doors, side windows, and windshield.

The camera(s) 104 are configured to provide panoramic video including a view of both the driver's and passenger's side doors and windows of any vehicle the system is mounted within, since these are common entry points for thieves breaking into vehicles when thieves commit vehicle theft, theft of electronic systems from the vehicle, or theft of other vehicle contents. In an embodiment, the views of both the driver's and passenger's side doors and windows is assembled from multiple cameras and includes views of both front and back doors when mounted within a typical 4-door passenger car. In other embodiments, the panoramic video is configured to cover a full 360-degree arc about the camera system and is provided in an embodiment by a single camera 104 with a 360-degree optical system, or, in another embodiment, by combining video from multiple cameras 104, each of which covers a portion of the 360-degree arc.

In an embodiment, camera(s) 104 are micro camera devices that are low powered and may be operated continuously from a battery power source. In one embodiment, camera 104 includes micro camera devices, such as Glance from Qualcomm, that consume power at a similar rate to passive infrared (PIR) sensors and may thereby be efficiently used for detecting motion.

In an embodiment, the sensor suite 102 also includes a lighting system 106 configured to illuminate an interior of the vehicle and/or an area around the vehicle to permit the camera(s) 104 to capture meaningful panoramic video at night, even when the vehicle is not parked near streetlights or other sources of external artificial light. In various embodiments, the lighting system 106 may be capable of generating light in either or both of the visible and infrared spectrums.

In some embodiments, the sensor suite 102 also includes a motion detector 108. The motion detector 108 is configured to sense motion in and around the vehicle, including motion caused by opening of vehicle doors or windows. In some embodiments, the motion detector 108 may comprise one or more infrared sensors, such as PIR sensors. In other embodiments, the motion detector 108 may comprise a sensor device that includes a lens, an image sensor, and a low-power processor in a very small package. The image processor 140 may, in some embodiments, be configured for running computer-vision algorithms for performing tasks such as detecting humans, determining if they are taking certain actions (such as jumping or walking toward or away from the sensor), and/or identifying certain hand or arm gestures. One example of the motion detector 108 is the Glance, which is available from Qualcomm.

In some embodiments, the sensor suite 102 also includes at least one accelerometer 110 adapted to detect accelerations of the camera system 100. For example, the accelerometer 110 may operate as a vibration sensor configured to detect vibrations associated with the vehicle. The accelerometer 110 may be located in the same housing as the cameras 104 or remotely therefrom and wirelessly coupled to or hardwired to the processing subsystem 119. In embodiments, the accelerometer 110 may be coupled with the metal frame of the vehicle. In embodiments, the accelerometer 110 may be coupled with one or more of a door, roof, hood, window, bumper or other component of the vehicle to obtain vibration information of typical break-in areas of the vehicle. In embodiments, multiple accelerometers 110 may be provided throughout the vehicle. Information from given ones of the multiple accelerometers 110 may be analyzed by the processing subsystem 119 to determine which of a plurality of the cameras 104 to activate. For example, an accelerometer 110 on a rear window may be used to activate a camera having a field of view of the rear window should the rear window be broken, or otherwise bumped, and sensed by the accelerometer 110. As another example, an accelerometer 110 located on the front hood of a vehicle may activate a forward-facing camera 104 if the hood is significantly bumped, or another vehicle hits the equipped vehicle from the front. As another example, an accelerometer 110 located on the rear bumper of a vehicle may activate a rearward facing camera 104 if the rear bumper is significantly bumped, or another vehicle hits the equipped vehicle from behind.

In some embodiments, the sensor suite 102 may include an audio sensor 111. The audio sensor 111 may be a microphone (e.g., a narrow-band microphone) capable of detecting the sound of breaking glass and/or other sounds, such as the sound of metal scraping against metal, which sound may be heard when a vandal "keys" (uses a key or other metal object to gouge the paint from) the equipped vehicle. When the audio sensor 111 is triggered (such as via detection of the frequency of breaking glass), the camera 104 may be activated.

In some embodiments, the sensor suite 102 includes a keypad 112 configured to permit manual entry of information, such as an arming code and/or a disarming code.

In some embodiments, the sensor suite 102 includes a power and ignition sensor 114 configured to detect disconnection of a vehicle power connection of the camera system 100 from vehicle power. In some embodiments, the power and ignition sensor 114 may be configured to detect starting and operation of a vehicle by observing voltage changes and electrical noise on the vehicle power connection.

In some embodiments, the sensor suite 102 also includes a mount-disturbance sensor 116 adapted to detect dismounting of the camera system 100. In a particular embodiment, where the camera system 100 is adapted for mounting to a windshield, the mount-disturbance sensor 116 is adapted to detect removal of the camera system 100 from the windshield. In another particular embodiment, where the camera system 100 is adapted for hanging from a mirror, the mount-disturbance sensor 116 is adapted to determine removal of the camera system 100 from the mirror. In another embodiment, the mount-disturbance sensor 116 includes a switch, such as a micro switch, adapted to detect removal of the camera system 100 from a dashboard upon which the camera system has been placed. In various embodiments, the mount-disturbance sensor 116 may include a switch, such as a micro switch, to detect physical removal from, or a proximity sensor to detect proximity to, the object to which the camera system 100 is mounted.

In some embodiments, the sensor suite 102 also includes an RFID (Radio Frequency Identification) sensor 118 that senses presence of a code transmitter near the camera system 100. In these embodiments, the code transmitter may be, for example, attached to a driver's key ring. When the RFID sensor 118 detects the code transmitter, any one or more components of the camera system may be deactivated. For example, a vehicle owner may not want to receive an indication of motion when the vehicle owner is entering his/her own car. The owner's mobile device (e.g., smart phone) may serve as a code transmitter to transmit an RFID code to the RFID sensor 118 and thereby deactivate the motion sensor 108, the accelerometer 110, and/or the audio sensor 111, for example.

In various embodiments, the sensor suite 102 may contain any combination of zero or more of the sensors 108-118, including, in some embodiments, all of the described sensors.

The sensor suite 102 is coupled to a processing subsystem 119 that includes a memory system 120 coupled to an image processor 140. The processing subsystem 119 may include one or more additional processors adapted for low power camera system, communications management, and processing of signals received from the sensor suite 102.

The memory system 120 includes a unique identifier 122 stored together with firmware 124 in a nonvolatile or volatile portion of the memory system 120. The firmware 124 includes video compression firmware 126, event detection firmware 128, and communication firmware 130. The video compression firmware 126 configures the processing subsystem 119 to receive the panoramic video from the camera 104 and to compress the panoramic video to generate a compressed video 132, which may be stored in a volatile or nonvolatile portion of the memory system 120. The compressed video 132 may be low-resolution and/or high-resolution video depending on the video mode of the camera 104.

The processing subsystem 119 is coupled to a digital radio subsystem 142 adapted to interface with a wireless network. The digital radio subsystem 142 and wireless network may operate on one or more protocols including, but not limited to, WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, Wi-Fi, or an IEEE 802.11-based radio frequency network. The communication firmware 130 may configure the processing subsystem 119 to format the compressed video 132 into a sequence of brief video clips, then to break the video clips into a sequence of data packets with suitable packet headers, and then to transmit the data packets of the compressed video 132 with the unique identifier 122 over the digital radio subsystem 142, through the wireless network (e.g., via cell towers or other wireless receivers, transmitters, transceivers, antenna, etc.) to a network-accessible server 160.

The camera system 100, in embodiments, includes a clock 149. The processing subsystem 119 may tag each video clip of the compressed video 132 with a timestamp according to a time the video clip was recorded.

The camera system 100 also includes a power subsystem 150, for providing power to the electronic camera 104, the processing subsystem 119, any included ones of the sensors 104-118, the memory system 120, and the digital radio subsystem 142. The power subsystem 150 may include one or both of a battery 152 and a charger 154 to permit operation of the camera system 100 for a time independent of vehicle power. In certain embodiments, the battery 152 is of a modular design that may be removed for recharging. Moreover, in embodiments including the battery 152, alerts regarding the battery charge level may be transmitted (e.g., as e-mails, text messages, and/or notifications) to a subscriber device 174 via the digital radio subsystem 142. The subscriber device 174 may be any stationary or portable device, such as a computer, a laptop, a tablet, a smartphone, or any other device having a display or other interface for interacting with the subscriber, configured with access to the server 160 via a wired and/or wireless network. In certain embodiments, alerts regarding the vehicle battery charge level may be transmitted (e.g., as e-mails, text messages, and/or notifications) to the subscriber device 174 via the digital radio subsystem 142, for example to notify the owner when the vehicle battery is becoming depleted.

Embodiments of the camera system 100 may also include a satellite navigation receiver 144 (e.g., a GPS receiver) adapted to determine a location of the camera system 100. In these embodiments, the processing subsystem 119 may be configured to further tag each of the video clips within the compressed video 132 with the determined location of the camera system 100 at the time the video clip was recorded by the camera 104. In embodiments, the location determined by the satellite navigation receiver 144 may be transmitted periodically to the server 160 for storage in a location database 166. The location determined by the satellite navigation receiver 144 may be also, or alternatively, be transmitted to the server 160 for storage in the location database 166 whenever the location of the camera system 100 changes, such as when the camera system 100 goes from a parked (stationary) location, and begins moving. As such, the current location of the camera system 100 is always updated within the location database 166. The location database 166 may be organized such that all received locations are associated with the given subscriber owning/operating the given camera system 100.

Although the camera system 100 may be configured to transmit the compressed video 132 to the server 160 continuously, in embodiments a low-bandwidth mode is provided whereby the compressed video 132 is transmitted at a low data rate, or merely connection maintenance packets are transmitted, to avoid excessive bandwidth use until an event is detected. In embodiments of the low-bandwidth mode, the camera system 100 may also be configured to capture low-resolution video (which may also have a lower frame rate) from the cameras 104 and store the low-resolution video in the compressed video 132 of the memory subsystem 120. In these embodiments, the event detection firmware 128 monitors the sensors 104-118 of the sensor suite 102 for triggering events and switches transmission to a high-bandwidth mode for a timeout period upon occurrence of a triggering event.

In embodiments, the event detection firmware 128 detects triggering events by monitoring one or more of the panoramic video captured by the camera 104, the motion detector 108, the accelerometer 110, and the audio sensor 111. The triggering events may include one or more of a vehicle door opening or closing (as may be detected by one or more of the camera 104, the motion detector 108, the accelerometer 110, and the audio sensor 111), motion exceeding a predefined threshold (as may be detected by the camera 104 and/or the motion detector 108), glass breaking (as may be detected by one or more of the camera 104, the accelerometer 110, and audio sensor 111), vibrations exceeding a certain threshold (as may be detected by the video camera 104 and/or the accelerometer 110), and a face detected in an image of a window of the vehicle (as may be detected by the camera 104). In certain embodiments, when a car alarm is fitted to the vehicle, the event detection firmware 128 may also detect when the car alarm is activated as a triggering event. The event detection firmware 128 may also be triggered by a remote source, such as one or more of the server 160, the subscriber device 174 and a third-party device 168. In one example of operation, where the server 160 is also connected to other security devices (e.g., a video doorbell, a floodlight camera, a home alarm system, and so on), where one or more of these other devices detects an event, the server 160 may trigger the event detection firmware 128, particularly where a last determined location of the camera system 100 is near the device detecting the event. For example, where a vehicle containing the camera system 100 is parked at the owner's home, and a security device at the owner's home detects and reports an event to the server 160, the server 160 may trigger the camera system 100 to capture and stream high resolution video from the camera 104.

When a triggering event is detected, the camera system 100 reverts from the low-bandwidth mode to the high-bandwidth mode. In the high-bandwidth mode, the compressed video 132 may be transmitted in near real-time to the server 160. In embodiments of the high-bandwidth mode, the camera system 100 may also be configured to capture high-resolution video from the cameras 104 and to store the low-resolution video as the compressed video 132 within the memory subsystem 120. In embodiments, the event detection firmware 128 detects triggering events by monitoring the sensor suite 102 for triggering events. Such monitoring may include monitoring the motion detector 108 for opening and closing of vehicle doors or windows or movement within the vehicle, monitoring the accelerometer 110 for accelerations related to motion of the camera system 100, monitoring the power and ignition sensor 114 for disconnection of a vehicle power connection of the camera system 100 from vehicle power, and monitoring the mount-disturbance sensor 116 for dismounting of the camera system 100.

Upon detection of any triggering event, such as door movement, movement in the vehicle, movement of the vehicle without disarming the system, glass break, scraping metal, and faces in the windows, the high-bandwidth mode is activated and the compressed video 132 is transmitted to the server 160 with a tag indicating a type of the triggering event. For example, if the accelerometer 110 senses accelerations indicative of motion of the camera system 100, the high-bandwidth mode is activated and the compressed video 132 may be transmitted to the server 160 with a motion-detected flag. In another example, if one or more faces are detected in images of the windows, the high-bandwidth mode is activated and the compressed video 132, including images of the detected faces, may be transmitted to the server 160 with a face-detected flag.

Door movement may be detected by one or more of the camera 104, the motion detector 108, the accelerometer 110, and the audio sensor 111. Vehicle movement may be detected by one or more of the camera 104, the motion detector 108, the accelerometer 110, and the audio sensor 111. Glass breakage may be detected by the camera 104 and/or the audio sensor 111).

In an embodiment, the memory system 120 includes arm/disarm firmware 146 adapted to detect entry of arm or disarm codes on the keypad 112. Upon entry of a disarm code, detection of triggering events is stopped—the system is disarmed—and the camera system 100 is set to the low-bandwidth mode. Upon entry of an arming code, detection of triggering events resumes—the camera system 100 is armed—and, upon detection of a triggering event, the camera system 100 may switch to the high-bandwidth mode. In various embodiments, the camera system 100 may be configured to self-arm based on one or more criteria, such as, for example, after detecting, using the accelerometer 110, that the vehicle has stopped and the ignition has been turned off, or after detecting, using the accelerometer 110, that the vehicle has remained stationary for at least a minimum length of time.

Since only a few seconds may elapse between entry of a thief to a vehicle and unplugging of the camera system 100, the battery 152 preferably provides sufficient power to continue transmission for a period of at least a few minutes, a few hours, or a few days after disconnection from an external power source, such as when a charging cord is unplugged or cut. For similar reasons, in order to provide sufficient video to identify a thief and any associated behavior, the camera system 100 may, in some embodiments, include the compressed video 132 recorded during a predetermined interval prior to each detected event with video transmitted at a high data rate to the server 160. For example, video recorded for 30 seconds prior to a detected event may be transmitted to the server 160. Since a thief may destroy or disable the camera system 100, in an embodiment the video recorded prior to the event, and for the first few seconds after the event, is transmitted to the server as a burst at the highest possible data rate compatible with the digital radio subsystem 142 and the wireless network, before reverting to a high-bandwidth mode that transmits the compressed video 132 in real-time. Since destruction or disablement of the camera system 100 may result in partial video files received by the server 160, the server 160 is configured to save all video received in a video database 162 even if a connection is dropped mid-file.

In some embodiments having the RFID sensor 118, when presence of the code transmitter is detected, the camera system 100 is disarmed, and when presence of the code transmitter is no longer detected, the camera system 100 is armed.

In some embodiments, the memory system 120 of the camera system 100 further includes recording media 147, such as a removable nonvolatile memory card or stick (e.g., "SD"-type "flash" memory), and the camera system 100 is configured to record the panoramic video and/or the compressed video 132 on the recording media 147 in a cyclic-buffer mode so that recent video overwrites older video upon exceeding available space on the recording media 147. Video stored on the recording media 147 is accessible in several ways, such as through a USB cable (not shown) connected to the camera system 100 or through removal of the recording media 147 from the camera system 100 for insertion into a computer (e.g., an adapter connected to a laptop computer).

In some embodiments, the camera system 100 may include a speaker 156. The speaker 156 and the audio sensor 111 may cooperate to provide two-way communication between the camera system 100 and an external device, such as the server 160, the subscriber device 174, and a third-party device 168. The third-party device 168 may be any stationary or portable device, such as a computer, a laptop, a tablet, a smartphone, or any other device having access to the server 160 via a wired and/or wireless network. Accordingly, in embodiments, if a triggering event occurs, in addition to the two-way communication being established, a live stream of the compressed video 132 may be transmitted to the external device. As such, theft or property damage may be reduced because the subscriber, for example, may deter the intruder to the vehicle by talking via the two-way communication between the camera system 100 and the external device.

In a particular embodiment, the event detection firmware 128 is configured to detect vehicle operation through any of the power and ignition sensor 114, presence of the code transmitter (e.g., the RFID code signal), or scene expansion in a forward view, and, upon detection of vehicle motion, switch the camera system 100 from the heretofore described security camera mode to a forward-looking dashcam mode. In the forward-looking dashcam mode, the panoramic view becomes a forward-looking through-the-windshield view. In a particular embodiment, the forward-looking windshield view further includes a rearward-looking view. In embodiments, both to provide a measure of privacy and to avoid excessive bandwidth use, transmission of compressed video to the server may be suppressed until vehicle operation ceases. However, captured video may be stored on the recording media 147, for example in a compressed state.

The charger 154 of the power subsystem 150 may be configured to be connected to a cigarette-lighter or power socket of the vehicle, and may further include a circuit configured to detect power interruption to the charger and to enter the high-bandwidth mode upon power interruption, such as may occur when the camera system 100 is being stolen.

In embodiments, the power subsystem 150 includes both the battery 152 and the charger 154. The battery 152 may be used when the charger 154 is either (a) unplugged from the vehicle power source, or (b) the vehicle is off and thus the charger 154 cannot obtain power from the vehicle. In embodiments, the battery 152 is configured to power the camera system 100 such that the camera 104 is always able to record in a low-resolution mode, even if the vehicle is off In such embodiments, the memory 120 may include a cycle buffer capable of storing a predetermined amount of low-resolution video, such as a day or a week's worth of low-resolution (or high-resolution) video. Accordingly, the camera 104 is always recording, and the user of the camera system 100 may access the low-resolution video, even if a triggering event does not occur. Further, if a triggering event does occur, and/or if the camera system 100 is powered by the charger 154, then the camera 104 may switch to a high-resolution video recording mode.

In a particular embodiment, the firmware 124 incorporates face identification firmware 148, and, upon recognizing presence of a face associated with an authorized driver, enters the disarmed mode.

In embodiments, data (such as any information stored within the memory subsystem 120), may be uploaded or synced from the camera system 100 to an external device. For example, data may automatically be transmitted to the server 160, the subscriber device 174, and/or the third-party device 168 whenever the camera system 100 is within range of the subscriber's home Wi-Fi network. The digital radio subsystem 142 may be configured to connect to the subscriber's home Wi-Fi network automatically, and initiate transmission of the data within the memory system 120 to the external device. This automatic uploading/syncing of the data within the memory system 120 may occur periodically or aperiodically (e.g., over the subscriber's home Wi-Fi network or alternatively a cellular data connection if the digital radio subsystem 142 is not connected to the subscriber's home Wi-Fi network), when a data-transmission event occurs (e.g., when the camera system 100 is within range of the subscriber's home Wi-Fi network, or when an event is detected by the sensor suite 102, etc.), or randomly. In the foregoing embodiment, Wi-Fi is provided as one example technology/protocol for the user's home wireless network.

The present embodiments, however, are not limited to Wi-Fi or to any other technology/protocol for the user's home wireless network.

In embodiments, the server 160 receives video (e.g., the compressed video 132) from the camera system 100 and stores the received video in the video database 162 together with the associated unique identifier 122 and any time tags, event detection flags (or other "flags" discussed herein), and location tags transmitted with the video from camera system 100. The server 160 may also include a subscriber database 164 containing names, user identifications, and contact information, such as telephone numbers and addresses, of subscribers who pay for use of the server 160 to store their video, together with a subscription status and the unique identifier 122 of all camera systems 100 that user is associated with. The subscriber database 164 may be searchable by unique identifier 122 as well as by subscriber name and/or user identification. In an embodiment, the databases 162, 164 may be accessed by user identification to determine unique identifiers 122 associated with the user identification, and then to locate video recorded on particular days and times by the camera system 100 having those unique identifiers and present in a vehicle of a subscriber recorded in the server 160 when that vehicle was burgled or stolen. The located video may be made available to law enforcement.

In an embodiment, upon establishment of a connection through the cellular telephone network from the camera system 100 to the server 160, the subscriber database 164 is queried using the unique identifier 122 to determine a subscription status of an associated user. If the subscription status is valid, then the connection is accepted, but if the subscription status is invalid, then the connection is refused, and no video is recorded by the server 160.

Video recorded by the camera system 100 may, in some cases, include images of criminal activity not directly associated with break-in or theft of the vehicle. Embodiments of the camera system 100 having the satellite navigation receiver 144 may tag the compressed video 132 with a location determined at the time it is recorded, such that these location tags are transmitted with that compressed video 132 to the server 160 and recorded with timestamps in the video database 162. Upon entry of a desired location and a range of times, the video database 162 may be searched for video tagged with locations near the desired location and time-stamped within the range of times. Any corresponding video found may be of use to law enforcement for solving criminal activity near where the vehicle was parked.

In order to protect privacy, upon retrieving video recorded at or near a desired location, the network accessible server 160 may be configured to retrieve usernames associated with the unique identifier 122 associated with the found video, and thereupon to request a release authorization from associated users before releasing the found video to any third party.

In embodiments, a third party may access the server 160 via the third-party device 168. The third-party device 168 may transmit a location request 170 to the server 160. The location request 170 may be a request for all of the camera systems 100 located within a particular geo-fence. In response to the location request 170, the server 160 may query the location database 166 to determine which of the camera systems 100 are located in the requested geo-fence, and transmit a list of the located camera systems to the third-party device 168. The third-party device 168 may then transmit a camera access request 172 requesting access to the video from one or all of the camera systems 100 on the list. The camera access request 172 may be a portion of the location request 170, in that the third-party device 168 may query the server 160 to provide all video from any camera system 100 within a given geo-fence. Moreover, in embodiments, the location request 170 may request video from a prior time frame, such as a date and a time range on that date, or a real-time "look-in" on all camera systems 100.

In embodiments, the third-party device 168 may only have access to locations within the location database 166. Any other information within the server 160, such as collected or near real-time video from the camera systems 100, may be accessible to the third-party device 168 only upon approval from each subscriber. In embodiments, the approval may be granted prior to generation/receipt of the location request 170, such as via a subscription agreement between the server 160 and the subscriber. In embodiments, the subscriber may be required to give approval to the server 160 prior to release of any information thereon. For example, upon receipt of the location request 170, the subscriber owning (or otherwise associated with) the requested camera system 100 may be requested for approval of the third party accessing the data associated therewith. For example, upon receiving location request 170 (and/or the camera access request 172), the server 160 may transmit, to the subscriber device 174, a camera access prompt 176. The camera access prompt 176 may query the subscriber whether information of the subscriber's camera system 100 (e.g., video from, the location of, and/or any other information regarding the camera system 100 stored in the server 160) may be transmitted to the third-party device. For example, the camera access prompt 176 may display, on the display of the subscriber device 174 (or via an audio prompt, text message, etc.): "The local police are requesting video from your camera system to investigate a potential crime. May we transmit the video to the local police?" The subscriber may then interact with the subscriber device 174 to provide a camera access response 178. If the camera access response 178 indicates that the subscriber has granted the third party access to the subscriber's camera system 100, then the server 160 may transmit the requested information to the third party.

FIG. 2 is a flowchart of a method 200 of performing surveillance of a parked vehicle using the camera system 100 of FIG. 1. The camera system 100 may be used to conduct surveillance of parked motor vehicles. The method 200 may begin with a user parking 202 the vehicle. In embodiments where the camera system 100 is suspended from the rear-view mirror or placed on a dashboard or side-window mount, the user then positions 204 the camera system 100—positioning the camera system is unnecessary with a dome-light mount and may also not be necessary if the camera system has a dashcam function and is already mounted to the dashboard or windshield. The user then arms 206 the camera system 100, in an embodiment, by entering a code on the keypad 112. In alternative embodiments, the camera system 100 is armed 206 automatically upon the driver exiting the vehicle. In another alternative embodiment, the camera system 100 is armed upon the user removing the code transmitter (e.g., a fob, the RFID code transmitter, or a mobile device transmitter) from within the vehicle. In another alternative embodiment, the camera system 100 is armed when the user speaks a particular command that is detected by the audio sensor 111 and decoded by the processing subsystem 119, for example. In other embodiments, the camera system 100 is always armed.

Once armed, at block 208, the camera system 100 then records panoramic video with the electronic camera 104. In one example of block 208, in one embodiment, the camera 104 continuously records low-resolution video and stores the low-resolution video as the compressed video 132. In another example of block 208, in one embodiment, the camera 104 continuously records low-resolution video when the camera system 100 receives power via the battery 152, and stores the low-resolution video as the compressed video 132. In another example of block 208, in one embodiment, the camera 104 continuously records high-resolution video and stores the high-resolution video as the compressed video 132. In another example of block 208, in one embodiment, the camera 104 records high-resolution video when the camera system 100 is receiving power via the charger 154, and stores the high-resolution video as the compressed video 132.

At block 210, the video is processed by the image processor 140 with the event detection firmware 128 and/or the face identification firmware 148 to detect triggering video events, such as door openings and/or faces visible in windows. Further, at block 212, the processing subsystem 119, executing the event detection firmware 128, monitors any other sensors 108-118 with which the camera system 100 is equipped to determine other types of triggering events known herein as sensor events, including but not limited to vibrations detected by the accelerometer 110, audio and/or glass break detected by the audio sensor 111, and/or other events captured by the sensors within the sensor suite 102.

At block 214, a decision is made. If there are no triggering events (sensor or video events), blocks 208 through 210 are repeated such that the camera system 100 continues recording the panoramic video 208 to a cyclic buffer within the memory system 120. If a triggering event (e.g., sensor or video event) is detected, at block 216, the image processor 140 executes the video compression firmware 126 to generate the compressed video 132 from recorded panoramic video, and uses the satellite navigation receiver 144 to determine a current location of the camera system 100. In one example of block 216, because a triggering event has occurred, in certain embodiments the camera 104 may be configured from a low-resolution mode to a high-resolution mode. In another example of block 216, in certain embodiments, the video from the camera 104 may be compressed in a low-resolution mode, such as when the camera system 100 is powered by the battery 152, and/or when the memory system 120 is running low on space. In another example of block 216, in certain embodiments, the video from the camera 104 may be compressed in a high-resolution mode, such as when the camera system 100 is powered by the charger 154.

At block 218, once the compressed video 132 is generated and the location of the camera system 100 is determined, the image processor 140 executing the communication firmware 130 uses the digital radio subsystem 142 to transmit the compressed video 132 (and potentially other information such as when the compressed video 132 is tagged with the location of the camera system 100, the unique identifier 122, and any event indicator flags) over the wireless network to the network-accessible server 160. In another example of block 218, in certain embodiments, the transmission occurs at a high data rate. In another example of block 218, in certain embodiments, the transmission occurs throughout a timeout period. In another example of block 218, in certain embodiments, the transmission occurs at a low data rate. In another example of block 218, in certain embodiments, connection maintenance packets are sent to the server at other times.

At block 220, the transmitted video is stored in the database 162.

At block 222, the camera system 100 checks 224 for vehicle operation or a still-parked condition. If vehicle operation is detected, the camera system 100 is reconfigured 226 as a dashcam such that panoramic video includes primarily a windshield view and the compressed video 132 is stored 228 on the recording media 147.

In alternative embodiments, the camera system 100 may record panoramic video 208 with the electronic camera 104 only after a triggering event is detected. For example, the camera system 100 may use the motion detector 108 to detect motion in the field of view of the camera system 100 and then activate the electronic camera 104 to record panoramic video 208. In such embodiments, to conserve battery power the electronic camera 104 may be maintained in an off state (or hibernation state) until the motion detector 108 detects the motion, after which the electronic camera 104 is activated to record panoramic video 208.

FIGS. 3 and 4 are flowcharts of example methods 250, 278 of locating video of interest to an investigation. With reference to FIG. 3, the method 250 locates video for a prosecution, when a driver determines 252 his vehicle has been stolen and enters his user identification into the server 160. A search 254 of the subscriber database 164 locates the unique identifiers 122 associated with that driver. The video database 162 is then searched 256 for video associated with those unique identifiers 122 and having timestamps in a range where the theft may have taken place. The driver then reviews 258 that video to identify video of, or associated with, that event. Then, the identified video may be provided 260 to investigators (e.g., local police).

In the method 278 (FIG. 4), when an investigation is in progress for a serious crime, such as a murder, a terrorist attack, or a kidnapping in a particular area, an investigator may determine 280 a need for any video recorded in that area that might help with the investigation of the crime. As such, in block 280, a third party may transmit one or both of the location request 170 and the camera access request 172 to the server 160 requesting information regarding a particular geo-fence. The video database 162, and/or the location database 166, is then searched 282 for video recorded within a determined distance of the area of the crime (or other significant event) and during a timeframe of interest. The time frame of interest may be a current time as of the location request 170. Once video is located, or a device is located within the geo-fence, the subscriber database 164 is searched 284 to identify users associated with those videos, and permission is requested 286 via transmission of the camera access prompt 176 and receipt of the camera access response 178, from those users to share 288 recorded video with the investigator. If permission or a court order is granted, the video is provided 288 to the investigator.

In an example embodiment of using the camera system 100, a driver places the camera system 100 so it has a view of doors and windows of the vehicle, and arms the camera system 100 before leaving the vehicle. The camera system 100 establishes a connection to the server 160 and maintains the connection. When a thief breaks into the vehicle to steal it, a triggering event is detected by the camera system 100 and video recorded immediately prior to, during, and for a timeout after, the event is transmitted to the server 160. In some cases of vehicular theft, or theft of vehicle contents, the video transmitted to and stored on the server 160 will include video of the thief. This video may be provided to law enforcement entities to help apprehend and/or prosecute the thief. Where a thief is unaware of the camera system 100, such as when the camera system 100 is concealed within a dome light, the video may in some cases include portions recorded within, and tagged with a GPS location of, a destination of the stolen vehicle, such as a business that disassembles stolen automobiles for the purpose of selling them as parts (a "chop shop"), and thereby facilitate both prosecution and vehicle recovery.

Figure 5:
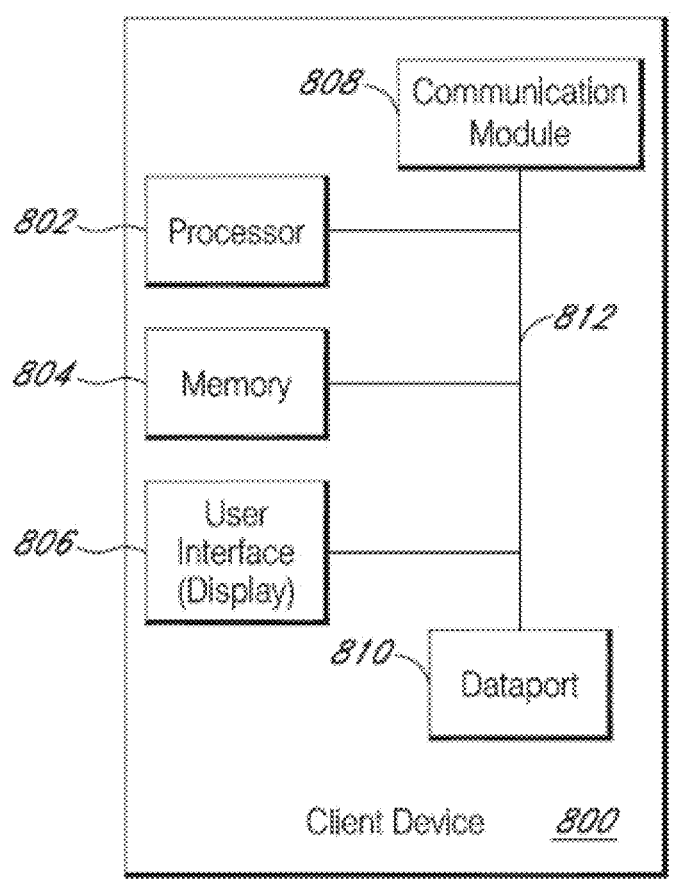
FIG. 5 is a functional block diagram of a client device on which the present embodiments may be implemented according to various aspects of the present disclosure.

FIG. 5 is a functional block diagram of a client device 800 on which the present embodiments may be implemented according to various aspects of the present disclosure. The subscriber device 174 and/or the third-party device 168 described above with reference to FIG. 1 may include some or all of the components and/or functionality of the client device 800. The client device 800 may comprise, for example, a smartphone, a tablet computer, a laptop computer, a desktop computer, etc.

With reference to FIG. 5, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 6:
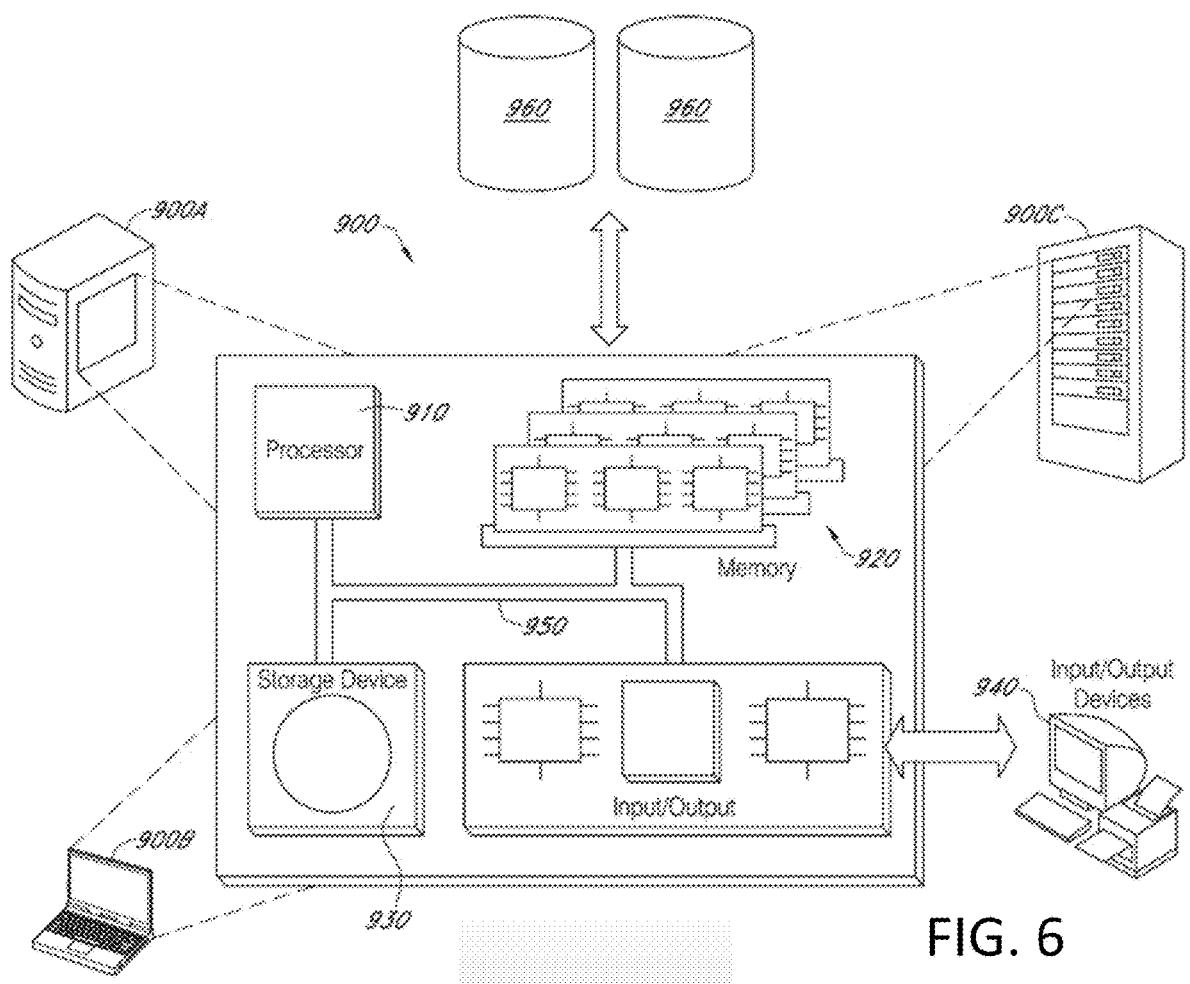
FIG. 6 is a functional block diagram of a general-purpose computing system on which the present embodiments may be implemented according to various aspects of the present disclosure.

FIG. 6 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Additional design considerations may be incorporated into a product without departing from the spirit and scope of this document. It should thus be noted that the matter contained in the above description and/or shown in the accompanying drawings should be interpreted as illustrative and not in a limiting sense. Accordingly, the following claims are intended to cover all generic and specific features described herein, as well as all statements of the scope of the present methods, and systems which, as a matter of language, might be said to fall therebetween.

Figure 7:
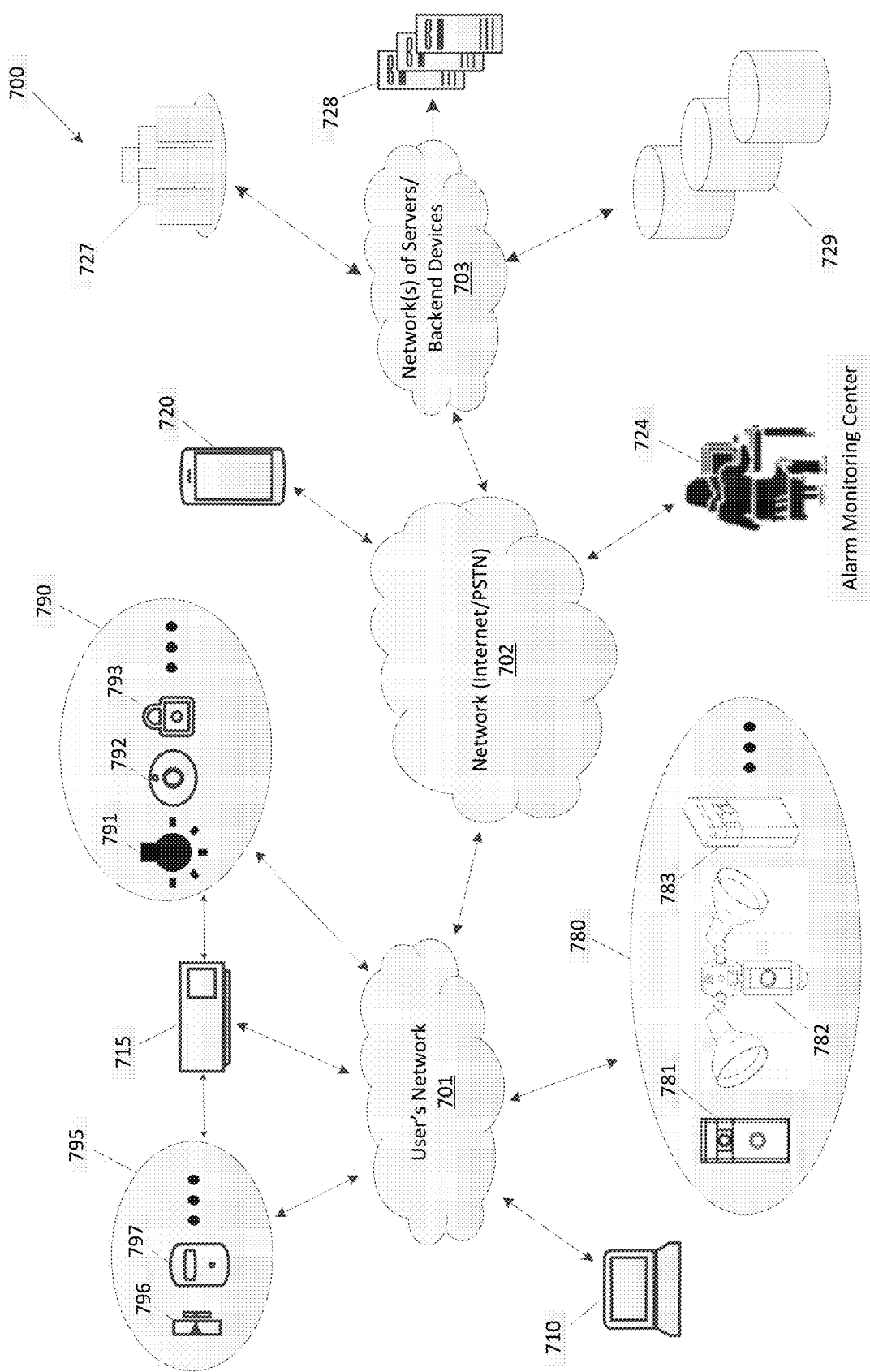
FIG. 7 is a functional block diagram illustrating a system including a hub device with which certain embodiments may be implemented, according to various aspects of the present disclosure.

FIG. 7 is a functional block diagram illustrating a system including a hub device with which certain embodiments may be implemented, according to various aspects of present disclosure. A system 700 for communication between several user devices is connected to a user's network (e.g., a home network) 701, and remote servers and other remote devices connected to other networks 702, 703. Specifically, the user's network 701, in some of the present embodiments, may include a hub device 715, security/alarm devices 795 and smart home devices 790 associated with the hub device 715, client device(s) 710, and audio/video (A/V) recording and communication devices 780. An alarm monitoring center 724 and a client device 720, among other entities and devices, may be connected to the public network 702. Additionally, the backend network 703 may include several backend devices, such as one or more remote storage devices 729, one or more servers 728, and one or more backend application programming interfaces (APIs) 727. For example, server 728 may represent server 160 of FIG. 1, client device 720 may represent subscriber device 174 and/or client device 800 of FIG. 5, and alarm monitoring center 724 may represent third-party device 168.

The user's network 701 may be, for example, a wired and/or wireless network (e.g., Ethernet network, Wi-Fi network, ZigBee network, Z-Wave network, etc.). Alternatively, or in addition, the user's network 701 may comprise various networks such as a cellular/mobile network, a local network, a public network, a low-bandwidth network, and/or any other appropriate network. If the user's network 701 is wireless, or includes a wireless component, the network 701 may be a Wi-Fi network compatible with the IEEE 802.11 standard and/or other wireless communication standard(s).

As shown in FIG. 7, the user's network 701 is connected to another network 702, which may comprise, for example, the Internet and/or a public switched telephone network (PSTN). As described below, the security devices 795, the smart home devices 790, and the A/V recording and communication devices 780 may communicate with the client devices 710, 720 via the network 701 and the network 702 (Internet/PSTN). In various embodiments, any or all of the hub device 715, the security devices 795, the smart home devices 790, and the A/V recording and communication devices 780 may communicate with the client devices 710, 720 directly (e.g., using one or more wireless technologies and/or protocols, such as Bluetooth, Bluetooth LE, ZigBee, Z-Wave, etc.). The network 702 may be any wireless network or any wired network, or a combination thereof, configured to operatively couple the above-mentioned modules, devices, and systems as shown in FIG. 7. For example, the network 702 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 7, the hub device 715, in some of the present embodiments, may comprise any device that facilitates communication with and control of the alarm devices 795 and the smart devices 790. In some aspects of the present embodiments, the hub device 715 may also facilitate communication with and control of the A/V recording and communication devices 780. The hub device 715 may be powered by a connection to an external power (e.g., AC mains). Additionally, the hub device 715 may include an internal backup battery to which the hub device 715 switches when the external power is disconnected.

The security devices 795 and the smart devices 790, in some of the present embodiments, may communicate with the hub device 715 directly (e.g., using one or more wireless technologies and/or protocols, such as Bluetooth, Bluetooth LE, ZigBee, Z-Wave, etc.) and/or indirectly (e.g., via the user's network 701). In some of the present embodiments, the A/V recording and communication devices 780 may communicate with the hub device 715 through one or more networks (e.g., the user's network 701 and the network 702). Although not shown in FIG. 7, in some embodiments, the hub device 715 may communicate directly with the A/V recording and communication devices 780 (e.g., via wired and/or wireless channels). In certain embodiments, the hub device 715 may include any or all of the components and/or functionality of the server 160 described in detail above with reference to FIG. 1.

With continued reference to FIG. 7, the alarm devices 795 may include, but are not limited to, monitoring sensors, such as contact sensors 796 (e.g., door sensors, window sensors, etc.), motion sensors 797, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 795 are tripped (or triggered), the sensor may immediately transmit an intrusion event signal to the hub device 715 via a communication path (e.g., a wireless and/or wired channel).

The smart devices 790 may include, but are not limited to, indoor/outdoor lighting systems (e.g., smart light emitting diodes (LEDs) 791), temperature control systems (e.g., thermostats 792), locking control systems for doors and/or windows (e.g., smart locks 793), shade/blind control systems (not shown), or any other automation (or smart home) devices that can communicate with, and be controlled by, the hub device 715.

In some of the present embodiments, the hub device 715 may be a component of a home automation system installed at a property of a user who is associated with the client devices 710,720. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 790 and the alarm devices 795, when remotely monitored and controlled via the network (Internet/PSTN) 702, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 790 and the alarm devices 795 may be controlled via a user interface in some of the present embodiments. The user interface may include any or all of a wall-mounted terminal, software installed on the client devices 710, 720 (e.g., a mobile application), a tablet computer or a web interface, and may communicate with Internet cloud services. In addition to communicating with, and/or controlling, the smart home devices 790 and the alarm devices 795, in various embodiments, the client devices 710, 720 may also be configured to be in network communication with, and/or controlling, the A/V recording and communication devices 780 (e.g., via the networks 701 and 702). The client devices 710, 720 may comprise, for example, a mobile phone such as a smartphone, or a computing device such as a tablet computer, a laptop computer, a desktop computer, etc. The client devices 710, 720 may include any or all of the components and/or functionality of the client device 800 described above with reference to FIG. 5.

With further reference to FIG. 7, the system 700 may also include one or more A/V recording and communication devices 780 (e.g., installed at the same property where the alarm devices 795 and smart home devices 790 are installed). The A/V recording and communication devices 780 may include, but are not limited to, video doorbells 781, lighting systems with A/V recording and communication capabilities (e.g., floodlight cameras 782, spotlight cameras (not shown), etc.), security cameras 783, or any other similar devices. As described above, in some embodiments, the user may control the A/V recording and communication devices 780 using either or both of the client devices 710, 720. Additionally, in some embodiments, the user may control the A/V recording and communication devices 780 through the hub device 715 (e.g., using either or both of the client devices 710, 720). In some embodiments, however, the client devices 710, 720 may not be associated with an A/V recording and communication device.

As described above, a user may control the smart home devices 790, the alarm devices 795, and/or the A/V recording and communication devices 780, using one or more applications executing on a client device of the user (e.g., the client device 720). For example, the user may turn on/off the lights 791, may turn up/down the temperature using the thermostat 792, may lock/unlock the doors and windows through the locks 792, etc. The user may also arm/disarm one or more of the security/alarm devices 795 (and one or more of the A/V recording and communication devices 780) using the client devices 710, 720.

With further reference to FIG. 7, the system 700 may also include one or more remote storage devices 729 (may be referred to interchangeably as "cloud storage device(s)"), one or more servers 728, and one or more backend application programming interfaces (APIs) 727 that are connected to network 703. The network 703 may be similar in structure and/or function to the above-described user's network 701. The hub 715 (and in some embodiments the hub's associated security devices 795 and smart devices 790) and/or the A/V recording and communication devices 780 may communicate with, and be managed by, the remote servers 728 and APIs 727 through the networks 701, 702, and 703. Examples of such communications are described below.

While FIG. 7 illustrates the storage devices 729, the servers 728, and the backend APIs 727 as components of the network 703 and separate from the network 702, in some aspects of the present embodiments, one or more of the storage devices 729, the servers 728, and the backend APIs 727 may be components of the network 702. Additionally, in some embodiments, the storage devices 729 may be separate from the backend servers 728 or may be an integral component of the backend servers 728. Any of the backend APIs 727 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 727 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 727 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 7, the system 700 may also include the security/alarm monitoring center 724. In some embodiments, each time the hub 715 receives an intrusion alert signal from one or more of the security/alarm devices 795 (e.g., when one or more of the sensors 796 and/or 797 are triggered), the hub 715 may send a security breach signal to the security/alarm monitoring center 724. In addition to the hub 715, the A/V recording and communication devices 780 of some embodiments may also send a security breach signal to the security/alarm monitoring center 724 when these devices determine that an emergency situation has occurred. For example, when one of the A/V recording and communication devices 780 (e.g., the floodlight camera 782) detects a suspicious person and/or activity in an area about the location of the A/V recording and communication device, the device may send a security breach signal to the alarm monitoring center 724.

The security/alarm monitoring center 724 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 710, 720. Typically, when the security/alarm monitoring center 724 does not receive an acknowledgment from the user, or receive an acknowledgment in which the user informs the center of an emergency situation (e.g., the user is away from home), the monitoring center may contact an emergency call center (not shown in the communication system 700). The emergency call center may comprise a local 911 call center that serves a region in which the hub 715 is located. The emergency call center may also be reached by the client devices 710, 720, and/or the backend devices 727, 728 directly (e.g., using a PSTN) or indirectly (e.g., through the networks 701, 702, and 703).

In some alternative embodiments, the security monitoring center 724 may not be a separate entity different from the backend servers 728 (and/or the backend APIs 727). For example, in some of the present embodiments, the backend servers 728 may monitor the home security devices 795 and/or the hub 715 (and other security systems not shown in the figures) in addition to managing the hub 715 and/or the A/V recording and communication devices 780.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A camera system adapted for installation in a vehicle, comprising:
   an electronic camera;
   non-volatile memory;

a unique identifier stored in the non-volatile memory;
a vehicle operation detector;
computer-readable instructions that, when executed by at least one processor, cause the camera system to:
  configure the electronic camera in a panoramic-view mode and capture panoramic video when the vehicle operation detector indicates the vehicle is off; and
  configure the electronic camera in one of a windshield-view mode or a rear-view mode when the vehicle operation detector indicates the vehicle is on;
  cause a digital image processing subsystem to:
    receive the panoramic video,
    compress the panoramic video into compressed video,
    identify at least one event in the panoramic video, and
    tag the compressed video with an event flag throughout a timeout period of occurrence of the at least one event; and
  cause a digital radio subsystem communicatively coupled with the image processing subsystem to transmit the compressed video and the unique identifier to a network-accessible server at a first data rate during the timeout period and at a second data rate outside the timeout period, the first data rate being higher than the second data rate; and
a power system comprising a battery and a charger, the power system electrically coupled to provide power to the electronic camera, the digital image processing subsystem, and the digital radio subsystem.

2. The camera system of claim 1, further comprising a satellite navigation receiver; and
  further computer-readable instructions that, when executed by the at least one processor, further cause the camera system to:
    determine a location of the camera system using the satellite navigation receiver; and
    tag the compressed video with the location of the camera system.

3. The camera system of claim 1, further comprising at least one accelerometer; and
  further computer-readable instructions that, when executed by the at least one processor, further cause the camera system to:
    detect motion of the camera system using the at least one accelerometer; and
    identify the motion as the at least one event.

4. The camera system of claim 1, further comprising further computer-readable instructions that, when executed by the at least one processor, further cause the camera system to cause the digital image processing subsystem to:
  identify at least one face in the panoramic video, and
  transmit at least one image of the at least one face to the server in response to detecting the at least one face.

5. The camera system of claim 2, further comprising:
  a recording media; and
  further computer-readable instructions that, when executed by the at least one processor, further cause the camera system to record the panoramic video on the recording media.

6. The camera system of claim 1, the panoramic video comprising a 360-degree panoramic view.

7. The camera system of claim 1, further comprising a motion detector; and
  further computer-readable instructions that, when executed by the at least one processor, further cause the camera system to:
    detect, using the motion detector, motion in a field of view of the camera system when the vehicle is not in motion; and
    activate the electronic camera to capture the panoramic video in response to detection of the motion.

8. The camera system of claim 1, further comprising further computer-readable instructions that, when executed by at least one processor, further cause the camera system to, using the power system, generate an alert regarding a charge level of a vehicle battery.

9. The camera system of claim 1, further comprising:
  a lighting system;
  further computer-readable instructions that, when executed by at least one processor, further cause the camera system to, using the lighting system, illuminate one or both of an interior of the vehicle and an area around the vehicle.

10. A camera system adapted for installation in a vehicle, comprising:
  a motion detector;
  an accelerometer;
  a camera having a field of view;
  a vehicle operation detector; and
  computer-readable instructions that, when executed by at least one processor, cause the camera system to:
    configure the camera into a panoramic-view mode and capture panoramic video when the vehicle operation detector indicates the vehicle is off;
    configure the electronic camera into one of a windshield-view mode or a rear-view mode when the vehicle operation detector indicates the vehicle is on;
    detect, using the motion detector, motion;
    detect, using the accelerometer, vibration of the vehicle; and
    control the camera to capture video based on a triggering event including one or both of detection of the motion or detection of the vibration.

11. The camera system of claim 10, further including a battery for powering the camera.

12. The camera system of claim 11, further comprising further computer-readable instructions that, when executed by at least one processor, further cause the camera system to: configure the camera for recording in a low-resolution recording mode when the battery is powering the camera system, and for recording in a high-resolution mode when a charger is powering the camera system.

13. The camera system of claim 10, further comprising further computer-readable instructions that, when executed by at least one processor, further cause the camera system to: configure the camera for recording in a low-resolution mode prior to the triggering event, and for recording in a high-resolution mode after the triggering event.

14. The camera system of claim 10,
  the accelerometer including a plurality of accelerometers positioned at respective locations of the vehicle; and
  the camera system further comprising further computer-readable instructions that, when executed by at least one processor, further cause the camera system to control the camera to capture a field of view including the location of one or more of the accelerometers detecting the triggering event.

15. The camera system of claim 14, the camera comprising a plurality of cameras,
  the camera system further comprising further computer-readable instructions that, when executed by at least one processor, further cause the camera system to activate one of the plurality of cameras associated with the location of one or more of the accelerometers detecting the triggering event.

16. The camera system of claim 10, the accelerometer being located on one or more of a bumper of the vehicle, a metal frame of the vehicle, a door of the vehicle, a roof of the vehicle, a hood of the vehicle, or a window of the vehicle.

17. The camera system of claim 10, further comprising:
an RFID (Radio Frequency Identification) sensor; and
further computer-readable instructions that, when executed by at least one processor, further cause the camera system to deactivate and activate the motion sensor and the accelerometer based on receipt of a code transmitted from an RFID transmitter.

18. The camera system of claim 10, further comprising further computer-readable instructions that, when executed by at least one processor, further cause the camera system to generate an alert regarding a charge level of a vehicle battery.

19. The camera system of claim 10, further comprising
a lighting system; and,
further computer-readable instructions that, when executed by at least one processor, further cause the camera system to, using the lighting system, illuminate one or both of an interior of the vehicle and an area around the vehicle.

* * * * *